(12) United States Patent
Barr et al.

(10) Patent No.: US 8,751,139 B2
(45) Date of Patent: Jun. 10, 2014

(54) SYSTEM, METHOD, AND APPARATUS FOR GAS ENGINE ENHANCED STARTING

(75) Inventors: Soren Andrew Barr, Blaine, MN (US); Ellard Harold Krohnfeld, Plymouth, MN (US); Stephen Anderson, Coon Rapids, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 1009 days.

(21) Appl. No.: 12/567,059

(22) Filed: Sep. 25, 2009

(65) Prior Publication Data

US 2011/0077847 A1    Mar. 31, 2011

(51) Int. Cl.
*F02B 43/00*    (2006.01)

(52) U.S. Cl.
USPC ......................................... 701/113; 123/527

(58) Field of Classification Search
USPC ....... 701/113, 102, 101; 123/27 GE, 525, 527
See application file for complete search history.

(56) References Cited

U.S. PATENT DOCUMENTS

| | | | |
|---|---|---|---|
| 4,151,821 A * | 5/1979 | Wichman et al. | 123/523 |
| 4,474,161 A * | 10/1984 | Knapp et al. | 123/478 |
| 4,513,727 A * | 4/1985 | Lagano et al. | 123/525 |
| 4,515,136 A * | 5/1985 | Cholvin et al. | 123/564 |
| 4,551,977 A * | 11/1985 | Matsumura | 60/611 |
| 5,005,550 A * | 4/1991 | Bugin et al. | 123/520 |
| 5,103,794 A * | 4/1992 | Shiraishi | 123/520 |
| 5,183,023 A * | 2/1993 | Hanson | 123/520 |
| 5,228,423 A | 7/1993 | Oikawa et al. | |
| 5,408,978 A * | 4/1995 | Davis | 123/527 |
| 5,713,336 A | 2/1998 | King et al. | |
| 5,713,340 A * | 2/1998 | Vandenberghe et al. | 123/682 |
| 5,832,906 A * | 11/1998 | Douville et al. | 123/527 |
| 5,969,435 A * | 10/1999 | Wilhelm | 307/64 |
| 5,979,418 A * | 11/1999 | Saruwatari et al. | 123/519 |
| 6,125,797 A * | 10/2000 | Dupointe | 123/27 GE |
| 6,285,178 B1 * | 9/2001 | Ball et al. | 323/351 |
| 6,382,182 B1 | 5/2002 | Green et al. | |
| 6,508,233 B1 * | 1/2003 | Suhre et al. | 123/478 |
| 6,516,786 B2 * | 2/2003 | Krimmer et al. | 123/520 |
| 6,550,459 B2 | 4/2003 | Gibson | |
| 6,568,379 B2 | 5/2003 | Larsen | |
| 7,240,669 B2 * | 7/2007 | Bertsch | 123/527 |
| 7,281,520 B2 | 10/2007 | Klenk et al. | |
| 7,308,889 B2 * | 12/2007 | Post et al. | 123/527 |

(Continued)

FOREIGN PATENT DOCUMENTS

WO    WO 2009084263 A1 *    7/2009

*Primary Examiner* — Mahmoud Gimie
*Assistant Examiner* — David Hamaoui
(74) *Attorney, Agent, or Firm* — Foley & Lardner LLP

(57) ABSTRACT

A system includes an internal combustion engine having an air intake and a pressurizing device disposed in the air intake. The pressurizing device is a turbocharger or a supercharger. A gaseous fuel supply is fluidly coupled to the air intake at a position upstream of the pressurizing device through a first fluid conduit and fluidly coupled to the air intake at a position downstream of the pressurizing device through a second fluid conduit. A valve is disposed in the second fluid conduit and includes an electronic control input. The valve responds to an electronic signal at the electronic control input. The system includes an engine start indicating device electronically coupled to the electronic control input, where the engine start indicating device provides the electronic signal to open the valve in response to the engine being in a starting operating condition.

30 Claims, 4 Drawing Sheets

(56) References Cited

U.S. PATENT DOCUMENTS

| | | | |
|---|---|---|---|
| 7,316,223 B2* | 1/2008 | Wakahara | 123/520 |
| 7,743,752 B2* | 6/2010 | Kerns et al. | 123/520 |
| 8,511,284 B2* | 8/2013 | Matsuki et al. | 123/516 |
| 2013/0014732 A1* | 1/2013 | Dasappa et al. | 123/527 |

* cited by examiner

SYSTEM, METHOD, AND APPARATUS FOR GAS ENGINE ENHANCED STARTING

BACKGROUND

The present application relates to enhanced engine starting and more particularly but not exclusively relates to engines using a gaseous fuel. Gaseous fueled engines often have a low pressure fuel delivery system. In a gaseous fueled engine having a pressurizing device such as a turbocharger or supercharger in the air intake, fuel delivery must generally be upstream of the pressurizing device or air intake will be at a higher pressure than the gaseous fuel supply at the entry point. For this reason and others, such as the need or desire to add fuel upstream of a mixer, there is often a long flow path from fuel delivery to the combustion chamber. During startup conditions, the fuel delivery delay as fuel initially travels along this flow path can cause emissions problems and/or excessive wear on the starter. Accordingly, there is a demand for further improvements in this area of technology.

SUMMARY

One embodiment is a unique technique for starting a gaseous fueled engine. Other embodiments include unique methods, devices, systems, and apparatus for engine starting. Further embodiments, forms, objects, features, advantages, aspects, and benefits shall become apparent from the following description and drawings.

DESCRIPTION OF THE ILLUSTRATIVE EMBODIMENTS

Figure 1:
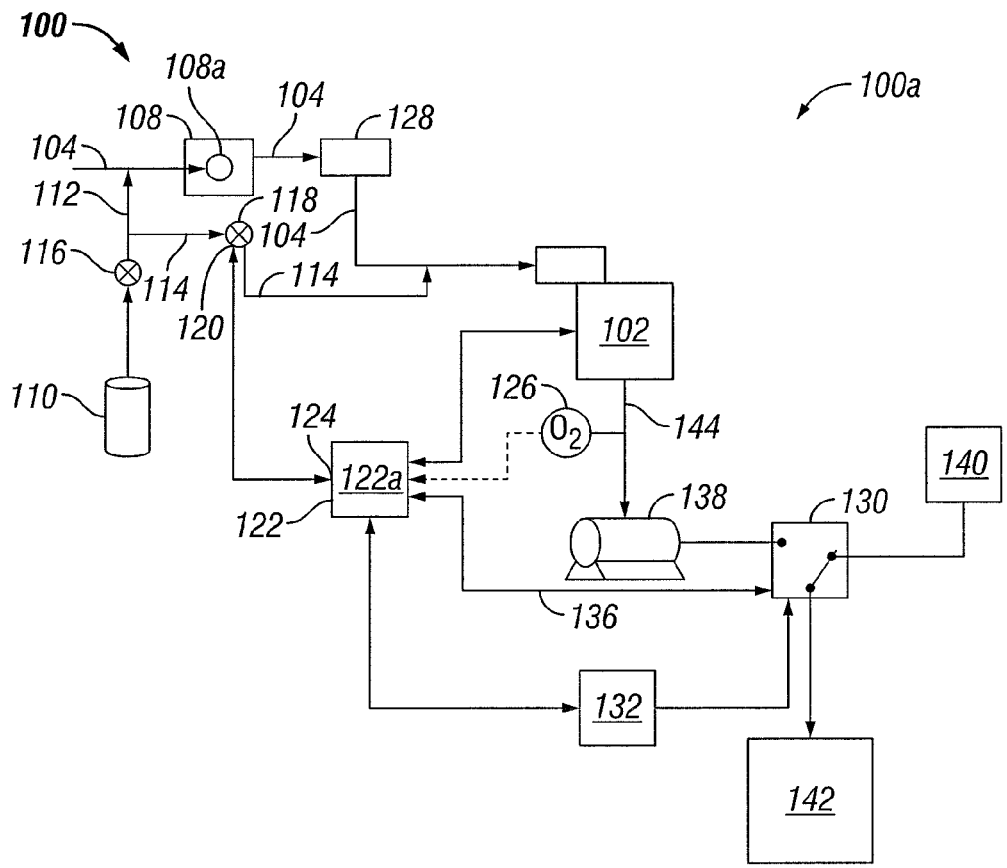
FIG. 1 is a schematic diagram of a system for gas engine enhanced starting.

For the purposes of promoting an understanding of the principles of the invention, reference will now be made to the embodiments illustrated in the drawings and specific language will be used to describe the same. It will nevertheless be understood that no limitation of the scope of the invention is thereby intended, and any alterations and further modifications in the illustrated embodiments, and any further applications of the principles of the invention as illustrated therein as would normally occur to one skilled in the art to which the invention relates are contemplated and protected.

FIG. 1 is a schematic diagram of a system 100 for gas engine enhanced starting. The system 100 includes an internal combustion engine 102 having an air intake 104. The internal combustion engine 102 may be any type of engine having a gaseous fuel supply 110 as a source of engine fuel. The gaseous fuel supply 110 may be the primary fuel for the engine 102, or may be one available fuel such as in a hybrid fueled engine. The gaseous fuel supply 110 includes a fuel that is gaseous as used in the engine 102, for example natural gas, Liquid Petroleum Gas (LPG), methane, molecular hydrogen, other gas fuels made from waste, biomass, coal or petroleum, or any fuel that is predominantly in a gas phase at standard temperature and pressure (STP), and/or any fuel that is predominantly in a gas phase as injected into the air intake 104. However, the gaseous fuel supply 110 may be stored or contained as a liquid (e.g. bottled propane or butane) at certain places within the system 100.

The system 100 further includes a pressurizing device 108 disposed in the air intake 104, where the gaseous fuel supply 110 is fluidly coupled to the air intake 104 at a position upstream of the pressurizing device 108 through a first fuel conduit 112, and fluidly coupled to the air intake at a position downstream of the pressurizing device 108 through a second fluid conduit 114. The pressurizing device 108 may be any pressurizing device known in the art, including but not limited to a compressor, a compressor portion 108a of a turbomachine 108, or a supercharger of any type. In system 100, pressurizing device 108 is depicted in the form of compressor 108a of turbocharger 108. The system 100 may include multiple pressurizing devices (not shown), in series or parallel.

The illustrated system 100 further includes a charge air cooler 128, and the second fluid conduit 114 fluidly couples the gaseous fuel supply 110 to the air intake 104 downstream of the charge air cooler 128. The system 100 may include any other known restrictions (e.g. mixers, venturis, flow meters, etc.) and the second fluid conduit 114 may fluidly couple the gaseous fuel supply 110 to the air intake 104 at any relative position to the restrictions, including upstream, downstream, or at about the same position as a restriction.

The system 100 further includes a valve 118 disposed in the second fluid conduit 114. The valve 118 includes an electronic control input 120, which may be an ordinary electrical connection to power the valve 118, a datalink connection to accept a command for a smart valve 118, or any other type of electronic control understood in the art. The valve 118 is responsive to an electronic signal at the electronic control input 120, for example the valve 118 may be normally-closed with no power at the electronic control input 120 and open when power is applied at the electronic control input 120. In certain embodiments, the valve 118 may be physically controlled by a hydraulic or pneumatic driver, and the electronic control input 120 may be remote from the valve body. Any valve 118 convention and/or configuration known in the art that controls the valve position based on the electronic control input 120 is contemplated herein.

The system 100 further includes an engine start indicating device 122 electronically coupled to the electronic control input 120. The engine start indicating device 122 provides the electronic signal to open the valve 118 in response to the engine being in a starting operating condition. In certain embodiments, the valve 118 is a normally-closed solenoid valve, i.e. a valve that is closed by a biasing force when no power is applied at the electronic control input 120, and the valve 118 opens when power is applied. The valve 118 may be oriented such that pressure in the air intake 114 applies closure force to the valve 118.

In the example of FIG. 1, the engine start indicating device 122 includes a controller 122a having an electronic output 124 wired to the electronic control input 120. Controller 122a may be an electronic circuit comprised of one or more components, including digital circuitry, analog circuitry, or both. Controller 122a operates in accordance with operating logic that may be in the form of software, firmware, a hardwired dedicated state machine, or a combination of these. In one particular embodiment, controller 122a is in the form of a microcontroller or microprocessor that is embedded with a computer readable memory in which operating logic is stored in the form of computer readable programming instructions executable therewith. The controller 122a may be a single device or may be distributed across multiple devices and/or may otherwise be implemented as would occur to those skilled in the art.

An exemplary embodiment of the operations performed in accord with operating logic of controller 122a are next described. The controller 122a determines whether the engine 102 is in a starting operating condition and provides the electronic signal on the electronic output 124 in response to determining the engine 102 is in the starting operating condition. The controller 122a determines the engine 102 is in the starting operating condition by any method understood in the art. Exemplary non-limiting examples include analyzing a stored data parameter indicating whether the engine 102 is in the starting operating condition, determining whether a starting solenoid for the engine is being powered, and/or determining whether an engine speed value is in an engine starting range.

For example, the controller 122a may be in communication with an engine controller (not shown) that publishes a data parameter indicating that the engine state is STARTING, which is stored as a data parameter on the controller 122a until the computer readable programming instructs the controller 122a to determine the engine operating state. The engine controller may also include the controller 122a and/or a portion of the controller 122a. In a second example, the controller 122a monitors the power across the starting solenoid to determine whether the engine 102 is presently starting. In a third example, the controller 122a monitors the engine speed, and determines the engine 102 is starting whenever the engine speed is within a certain speed range. In a further example, the starting speed range may be a range above a very low speed threshold (e.g. 5 RPM) up to a number just below a stable idle speed value (e.g. below 450 RPM), although the exact ranges for any embodiment that can be considered starting speed ranges vary by the application and can be selected according to the desired amount of starting assistance.

In a fourth example, the controller 122a interprets a power transfer operating condition and provides the electronic signal on the electronic output 124 in response to determining the power transfer operating condition is a backup power condition. The controller 122a interprets the power transfer operating condition according to a state of a transfer switch 130, according to a parameter published by or electronic signal output by a transfer controller 132 that is in communication with the transfer switch 130, or by any other method understood in the art. The power transfer operating condition includes a state of a power transfer switch 130 and/or a power transfer signal as supplied by the transfer controller 132 where present. The system 100 further includes a load 142 selectively powered by a primary electric power source 140 typically in the form of a connection to a public electric utility grid and a backup power source in the form of electric power generator 138. Generator 138 receives rotary mechanical power from engine 102 and converts it into electricity in a standard manner. Collectively, engine 102, generator 138, and optionally other features of system 100 are designated genset 100a. When the power transfer operating condition is in the backup power condition, a power source of the load 142 is switching (or already switched) from the primary power source 140 to the backup power source 138.

Although the generator 138 is illustrated as a backup power source, the generator 138 may be the primary power source or even the sole power source for the load 142 in certain embodiments. The system 100 may further include multiple engines 102 and generators 138 (or multiple gensets) in parallel. The utilization of the transfer switch 130 state may allow for a slightly improved response time of the valve 118 in certain embodiments relative to responding to power at the starter solenoid. In certain embodiments, the controller 122a utilizes the transfer switch 130 state as a parameter in a logical determination of times to hold the valve open. For example, the controller 122a may open the valve 118 solely on the basis of the transfer switch 130 indicating power for the load 142 is to come from the generator 138 before the engine 102 is started, but close the valve 118 after the engine 102 starts even though the transfer switch 130 may continue to indicate power for the load 142 comes from the generator 138. Any manipulations of the engine starting state and transfer switch state to determine valve opening times and events are contemplated herein.

In certain embodiments, the controller 122a further determines whether the engine 102 transitions from the starting operating condition to a running operating condition, and closes the valve 118 over a period of time in response to the engine transition from the starting operating condition to the running operating condition. The valve 118 may be closed immediately upon the engine 102 transitioning to the run state, and some improvement of engine startup is still realized. When the valve 118 is open, a portion of the fuel flows through the first fluid conduit 112 and the remaining fuel flows through the second fluid conduit 114.

If the valve 118 closes, the fuel through the second fluid conduit 114 ceases and the entire scheduled fuel (e.g. as controlled through a valve 116) flows through the first fluid conduit 112. In response to a relatively instantaneous closure of the valve 118, there may be a brief transition period where a relatively lean slug of fuel-air mixture passes through the air intake 114. When the valve closes more slowly over a period of time, the relatively lean slug of fuel-air mixture can be reduced, such that the transition to normal fueling may be smoother. The desired valve 118 closure time can vary among different implementations, and/or with various operating conditions, such as the initial percentage of the fuel which is delivered on the second fluid conduit 114, the air intake 104 volume between the inlet of the first fluid conduit 112 and the inlet of the second fluid conduit 114, the flow rate of gases through the air intake 104, and other parameters of the system 100. Generally, and without limitation, a closure time between a few tens of milliseconds to one or two seconds is desired in certain embodiments, although closure times indicating relatively instantaneous closure of the valve 118 are desired in certain embodiments.

In the depicted embodiment, the system 100 includes an oxygen sensor 126 operationally coupled to an engine exhaust flow 144 and the controller 122a closes the valve 118 over a period of time such that an air-fuel ratio measured at the oxygen sensor 126 does not exceed a threshold value. Any type of air-fuel ratio sensor known in the art may be utilized for the oxygen sensor 126, or an analogous sensor such as a $NO_x$ sensor capable of also estimating oxygen. For example, the oxygen sensor 126 may be a lambda based sensor, and the controller 122a may control the valve 118 position during closure such that the reported lambda does not exceed a predetermined lean value.

Figure 2:
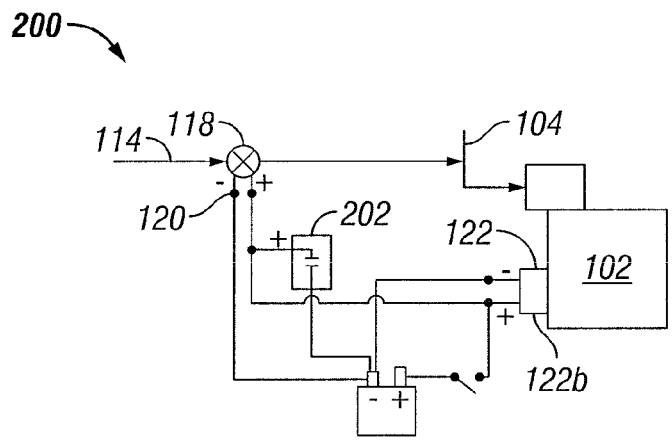
FIG. 2 is a schematic diagram of an apparatus including a valve structured to close over a period of time.

FIG. 2 is a schematic diagram of an apparatus 200 including a valve 118 structured to close over a period of time; where like reference numerals refer to like features previously described in connection with system 100. The engine start indicating device 122 is a starting solenoid 122b wired in parallel with the electronic control input 120. In the example, when the solenoid 122b is powered, the valve 118 is opened. The apparatus 200 further includes a capacitor 202 wired in parallel with the electronic control output 120, such that when the starter solenoid 122*b* transitions from powered to not-powered, the valves closes over a period of time due to the decay voltage supplied by the capacitor 202. The capacitor 202 is sized to control the valve 118 closing period of time.

Figure 5:
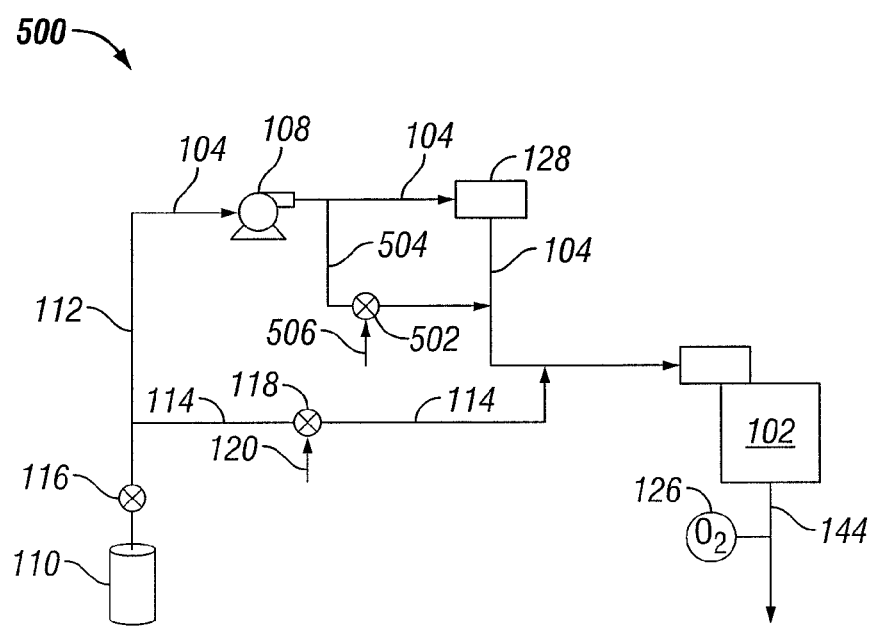
FIG. 5 is a schematic diagram of an alternate embodiment of a system for gas engine enhanced starting.

Referencing FIG. 5, a portion of a system 500 is shown for enhancing engine startup; where like reference numerals refer to like features previously described. In addition to the embodiment of FIG. 1, the system 500 includes an air switching valve 502 responsive to an electronic air control input 506. In response to an input at the electronic air control input 506, for example power supplied at the electronic air control input 506, at least a portion of the air intake 104 flow goes through an air intake bypass 504. The air intake bypass 504 bypasses one or more restrictive components in the air intake, including the pressurizing device 108 and/or the charge air cooler 128. An engine start indicating device provides an air bypass electronic signal to the electronic air control input 506 in response to the engine 102 being in the starting operating condition.

Figure 3:
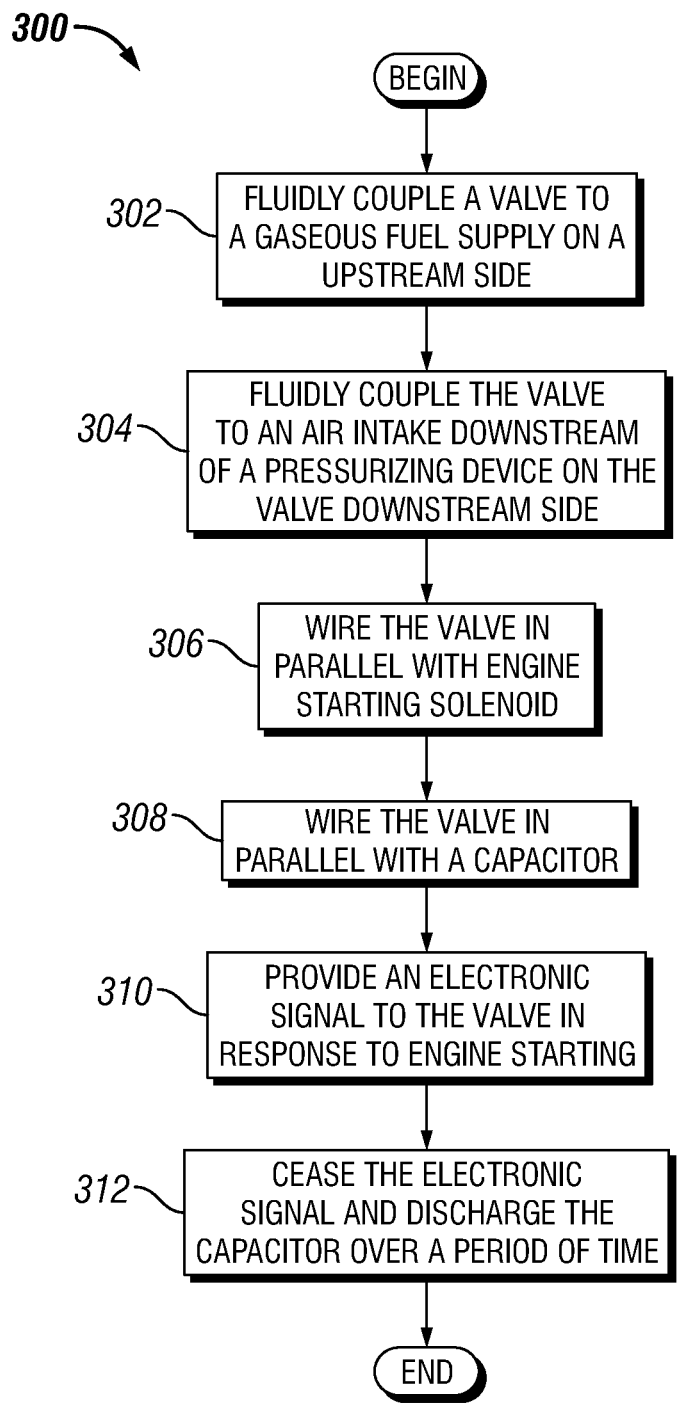
FIG. 3 is a schematic flow diagram of a procedure for installing an engine start enhancing valve.
Figure 4:
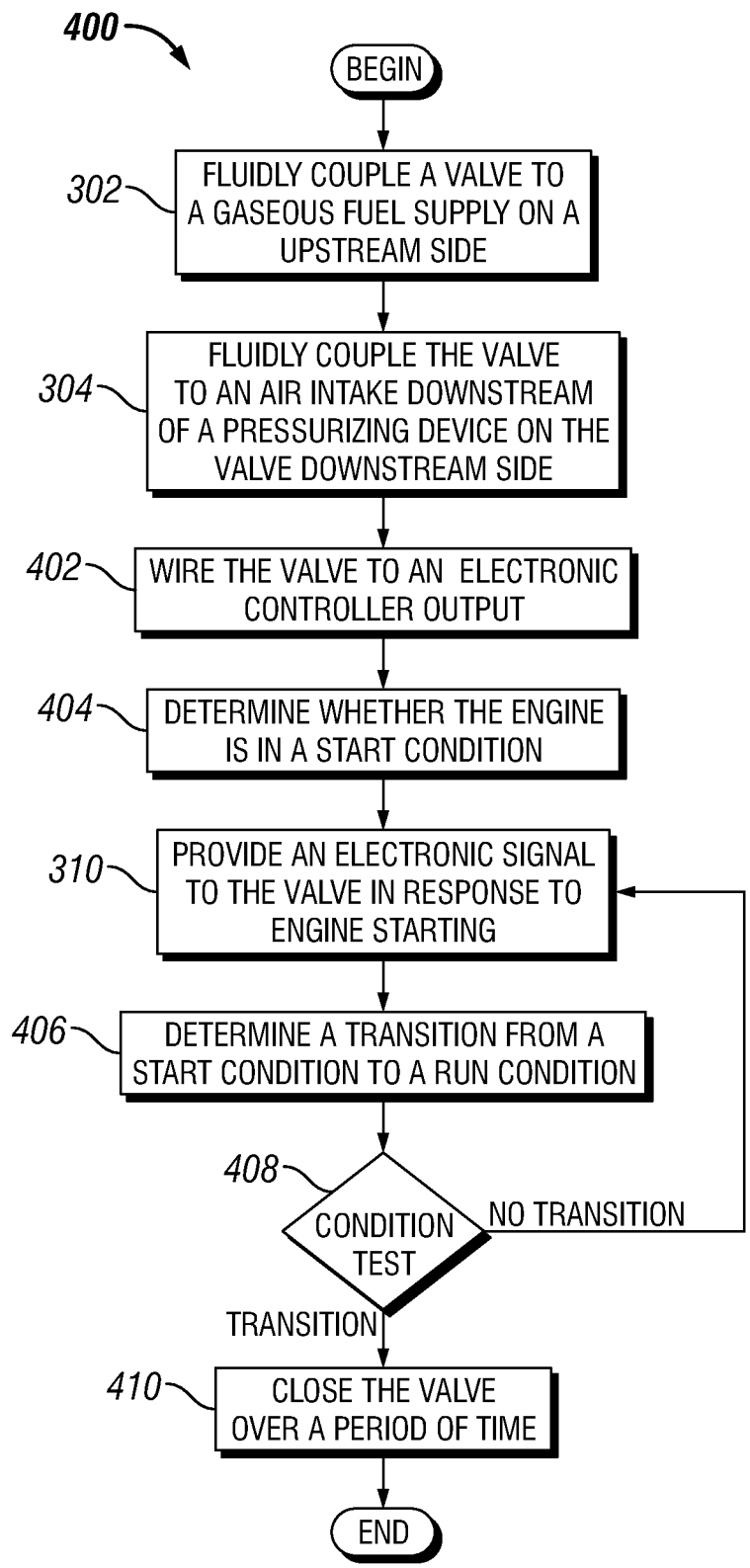
FIG. 4 is a schematic flow diagram of an alternate procedure for installing an engine start enhancing valve.

The schematic flow diagrams in FIGS. 3 and 4, and the related descriptions which follow, provide illustrative embodiments of procedures for installing an engine start enhancing valve. Operations illustrated are understood to be exemplary only, and operations may be combined or divided, and added or removed, as well as re-ordered in whole or part, unless stated explicitly to the contrary herein. Some or all of the described operations may be performed in accordance with operating logic of one or more controllers (such as controller 122*a*), but in others may be otherwise performed without a controller.

FIG. 3 is a schematic flow diagram of a procedure 300 for installing an engine start enhancing valve. The procedure 300 includes an operation 302 to fluidly couple an upstream side of a valve 118 to a gaseous fuel supply 110, and an operation 304 to fluidly couple a downstream side of the valve 118 to an engine air intake 114 at a position downstream of a pressurizing device 108. The procedure 300 further includes an operation 306 to wire the valve 118 in parallel with a starting solenoid 122*b* for the engine 102 thereby providing the engine start indicating device 122, and an operation 308 to wire a capacitor 202 in parallel with the valve 118. The procedure 300 further includes an operation 310 to provide an electronic signal from the engine start indicating device 122 in response to the engine 102 being in a starting operating condition such that the valve 118 opens during the starting operating condition. The procedure 300 further includes an operation 312 to cease the electronic signal from the engine start indicating device 122 and discharging the capacitor 202 over the period of time, for example in response to the engine transitioning from the starting operating condition to a running operating condition.

FIG. 4 is a schematic flow diagram of an alternate procedure 400 for installing an engine start enhancing valve. The procedure 400 includes the operations 302, 304 as described in reference to the procedure 300. The procedure 400 further includes an operation 402 to wire the valve 118 to an electronic output 124 of a controller 122*a*, and an operation 404 to determine whether the engine 102 is in a starting condition. The procedure 400 further includes an operation 310 to provide an electronic signal from the controller 122*a* in response to the engine 102 being in a starting operating condition such that the valve 118 opens during the starting operating condition. The procedure 400 further includes an operation 406 to determine whether the engine 102 has transitioned from a start condition to a run condition. The procedure 400 includes a conditional 408 that continues with the operation 310 if the engine 102 has not transitioned from the starting operating condition, and that directs the procedure 400 to an operation 410 to close the valve 118 over a period of time if the engine 102 has transitioned from the starting operating condition to a running operating condition. The operation 410 to close the valve 118 over a period of time may include commanding a decreasing valve position over the period of time until the valve 118 is closed.

As is evident from the figures and text presented above, a variety of embodiments according to the present invention are contemplated.

One exemplary embodiment is a method including fluidly coupling an upstream side of a valve to a gaseous fuel supply for an engine, fluidly coupling a downstream side of the valve to an air intake of the engine at a position downstream of a pressurizing device, and in response to starting the engine, actuating the valve to route gaseous fuel from the gaseous fuel supply to the position downstream of the pressurizing device. In a further embodiment, the method includes electronically coupling the valve to an engine start indicating device such that the valve opens in response to an electronic signal from the engine start indicating device and providing the electronic signal from the engine start indicating device in response to the engine being in a starting operating condition. In further embodiments, electronically coupling the valve to an engine start indicating device includes wiring the valve in parallel with a starting solenoid for the engine, or wiring the valve to an electronic output of a controller, where the controller provides an electronic signal from the engine start indicating device by powering the electronic output in response to the engine being in the starting operating condition. In a still further embodiment, the controller determines the engine is in the starting operating condition analyzing a stored data parameter indicating whether the engine is in the starting operating condition, determining whether a starting solenoid for the engine is being powered, and/or determining whether an engine speed value is in an engine starting range.

The exemplary method further includes closing the valve over a period of time in response to the engine transitioning from the starting operating condition to a running operating condition. The method may include wiring a capacitor in parallel with the valve, and closing the valve over a period of time includes ceasing the electronic signal from the engine start indicating device and discharging the capacitor over the period of time. In an alternate embodiment, the controller closes the valve over a period of time by commanding a decreasing valve position over the period of time.

Another exemplary embodiment is a system including an internal combustion engine having an air intake, a pressurizing device disposed in the air intake, a gaseous fuel supply fluidly coupled to the air intake at a position upstream of the pressurizing device through a first fuel conduit and fluidly coupled to the air intake at a position downstream of the pressurizing device through a second fluid conduit, a valve disposed in the second fluid conduit, the valve having an electronic control input, the valve responsive to an electronic signal at the electronic control input, and an engine start indicating device electronically coupled to the electronic control input, the engine start indicating device that provides the electronic signal to open the valve in response to the engine being in a starting operating condition.

In certain embodiments, the system further includes the engine start indicating device as a starter solenoid wired in parallel with the electronic control input, such that when the starter solenoid is powered the valve is open. In a further embodiment, the system includes a capacitor wired in parallel with the electronic control output, such that when the starter solenoid transitions from powered to not-powered, the valves closes over a period of time. The valve may be a normally-closed solenoid valve, i.e. a valve that is closed by a biasing force when no power is applied and open when power is applied, and the solenoid valve may be oriented such that pressure in the air intake applies closure force to the valve.

The engine start indicating device can include a controller having an electronic output wired to the electronic control input, where the controller determines whether the engine is in the starting operating condition and provides an electronic signal on the electronic output in response to determining the engine is in the starting operating condition. The controller further determines whether the engine transitions from the starting operating condition to a running operating condition, and closes the valve over a period of time in response to the engine transition from the starting operating condition to the running operating condition. In a further embodiment, the system includes an air-fuel ratio sensor operationally coupled to an engine exhaust flow at a position downstream of the valve, and the controller closes the valve over a period of time such that an air-fuel ratio measured at the air-fuel ratio sensor does not exceed a threshold value.

The pressurizing device may include a supercharger and/or a turbocharger. In certain embodiments, the system includes a charge air cooler disposed in the air intake at a position downstream of the pressurizing device. The second fluid conduit fluidly couples the gaseous fuel supply to the air intake at a position downstream of the charge air cooler.

Yet another exemplary embodiment is an apparatus including a pressurizing device disposed in an air intake for an internal combustion engine, a valve fluidly coupled on an upstream side to a gaseous fuel supply and fluidly coupled on a downstream side to the air intake at a position downstream of the pressurizing device, the valve having an electronic control input, where the valve opens in response to an electronic signal at the electronic control input, and an engine start indicating device that provides the electronic signal in response to the internal combustion engine being in a starting operating condition. The engine start indicating device may include a starting solenoid wired in parallel with the electronic control input, such that when the starter solenoid is powered the valve is open. In certain embodiments, the engine start indicating device includes a controller having an electronic output wired to the electronic control input, where the controller determines whether the engine is in the starting operating condition and provides an electronic signal on the electronic output in response to determining the engine is in the starting operating condition.

In a further embodiment, the controller interprets a power transfer operating condition and provides the electronic signal on the electronic output in response to determining the power transfer operating condition is a backup power condition. The power transfer operating condition includes a state of a power transfer switch and/or a power transfer signal. The apparatus further includes a load selectively powered by a primary power source and a backup power source, where the backup power source includes a generator driven by the engine. When the power transfer operating condition is in the backup power condition, a power source of the load is switching from the primary power source to the backup power source.

Yet another exemplary embodiment is a method including fluidly coupling an upstream side of a valve to a gaseous fuel supply for an engine, fluidly coupling a downstream side of the valve to an air intake of the engine at a position downstream of a pressurizing device, and in response to starting the engine, opening the valve to route gaseous fuel from the supply to the position downstream of the pressurizing device for a desired period of time. In certain further embodiments, the method further includes closing the valve after the desired period of time, and/or supplying gaseous fuel upstream of the pressurizing device after the desired period of time. The pressurizing device may be a compressor of a turbocharger. In certain embodiments, the valve is responsive to one or more control signals from a controller, the control signal(s) generated in response to the starting of the engine. In certain embodiments, the desired period of time is a period of time over which engine start assistance is desired including a specified time period, a time period for the engine to reach a specified engine speed, or other time period understood in the art based on the engine and specific application.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
  fluidly coupling a gaseous fuel supply for an engine to an air intake of the engine upstream of a pressurizing device in the air intake with a first fuel conduit;
  fluidly coupling an upstream side of a valve in a second fuel conduit to the gaseous fuel supply for the engine;
  fluidly coupling a downstream side of the valve to the air intake of the engine at a position downstream of the pressurizing device so that the second fuel conduit bypasses the pressurizing device;
  in response to starting the engine, actuating the valve to route gaseous fuel from the gaseous fuel supply through the second fuel conduit to the position downstream of the pressurizing device and then to the engine while supplying gaseous fuel to the air intake upstream of the pressurizing device through the first conduit; and
  in response to the engine transitioning from starting to a running operating condition, closing the valve to cease gaseous fuel supply from the second fluid conduit so the engine is entirely supplied with gaseous fuel from the first fluid conduit in the running operating condition.

2. The method of claim 1, wherein actuating the valve to route gaseous fuel from the gaseous fuel supply from the second fuel conduit to the position downstream of the pressurizing device in response to starting the engine comprises: electronically coupling the valve to an engine start indicating device such that the valve opens in response to an electronic signal from the engine start indicating device and providing the electronic signal from the engine start indicating device in response to the engine being in a starting operating condition.

3. The method of claim 2, wherein electronically coupling the valve to an engine start indicating device comprises wiring the valve in parallel with a starting solenoid for the engine.

4. The method of claim 2, wherein electronically coupling the valve to the engine start indicating device comprises wiring the valve to an electronic output of a controller, and wherein providing the electronic signal from the engine start indicating device comprises powering the electronic output in response to the engine being in the starting operating condition.

5. The method of claim 4, further comprising determining the engine is in the starting operating condition by a start detection procedure selected from the procedures consisting of analyzing a stored data parameter indicating whether the engine is in the starting operating condition, determining whether a starting solenoid for the engine is being powered, and determining whether an engine speed value is in an engine starting range.

6. The method of claim 1, further comprising closing the valve over a period of time in response to the engine transitioning from starting to the running operating condition, wherein the period of time corresponds to the engine obtaining a minimum speed that is below an idle speed.

7. The method of claim 2, further comprising wiring a capacitor in parallel with the valve, and wherein closing the valve comprises ceasing the electronic signal from the engine start indicating device and discharging the capacitor over a period of time.

8. The method of claim 2, wherein electronically coupling the valve to the engine start indicating device comprises wiring the valve to an electronic output of a controller, wherein the providing an electronic signal from the engine start indicating device comprises powering the electronic output in response to the engine being in the starting operating condition, and wherein closing the valve comprises the controller commanding a decreasing valve position over a period of time.

9. A system, comprising:
an internal combustion engine having an air intake;
a pressurizing device disposed in the air intake;
a gaseous fuel supply fluidly coupled to the air intake at a position upstream of the pressurizing device through a first fluid conduit and fluidly coupled to the air intake at a position downstream of the pressurizing device through a second fluid conduit that bypasses the pressurizing device;
a valve disposed in the second fluid conduit, the valve having an electronic control input, the valve responsive to an electronic signal at the electronic control input; and
an engine start indicating device electronically coupled to the electronic control input, the engine start indicating device structured to provide the electronic signal to open the valve in response to the engine being in a starting operating condition to supply gaseous fuel from the second fluid conduit for starting the engine while supplying gaseous fuel to the air intake upstream of the pressurizing device through the first fluid conduit, wherein the engine start indicating device is further structured to close the valve to cease gaseous fuel supply from the second fluid conduit in response to the engine transitioning from the starting operating condition to a running operating condition where the engine is entirely supplied with gaseous fuel from the first fluid conduit.

10. The system of claim 9, wherein the engine start indicating device comprises a starter solenoid wired in parallel with the electronic control input, such that when the starter solenoid is powered the valve is open.

11. The system of claim 10, further comprising a capacitor wired in parallel with the electronic control output, such that when the starter solenoid transitions from powered to not-powered, the valves closes over a period of time.

12. The system of claim 9, wherein the valve is a normally-closed valve positioned such that pressure in the air intake applies a closure force that normally closes the valve.

13. The system of claim 9, wherein the engine start indicating device comprises a controller having an electronic output wired to the electronic control input, the controller structured to:
determine whether the engine is in the starting operating condition; and
provide an electronic signal on the electronic output in response to determining the engine is in the starting operating condition.

14. The system of claim 13, where the controller is further structured to:
determine whether the engine transitions from the starting operating condition to the running operating condition; and
close the valve over a period of time in response to the engine transition from the starting operating condition to the running operating condition.

15. The system of claim 14, further comprising an air-fuel ratio sensor operationally coupled to an engine exhaust flow at a position downstream of the valve, wherein the controller is further structured to close the valve over a period of time such that an air-fuel ratio measured at the air-fuel ratio sensor does not exceed a threshold value.

16. The system of claim 9, wherein the pressurizing device comprises one of a supercharger and a turbocharger.

17. The system of claim 16, further comprising a charge air cooler disposed in the air intake at a position downstream of the pressurizing device.

18. The system of claim 17, wherein the second fluid conduit fluidly couples the gaseous fuel supply to the air intake at a position downstream of the charge air cooler.

19. An apparatus, comprising:
a pressurizing device disposed in an air intake for an internal combustion engine;
a first fluid conduit fluidly coupling a gaseous fuel supply to an upstream side of the pressurizing device;
a second fluid conduit including a valve fluidly coupled on an upstream side to the gaseous fuel supply and fluidly coupled on a downstream side to the air intake at a position downstream of the pressurizing device, the valve having an electronic control input, the valve structured to open in response to an electronic signal at the electronic control input; and
an engine start indicating device structured to provide the electronic signal in response to the internal combustion engine being in a starting operating condition to open the valve and supply gaseous fuel from the second fluid conduit for starting the engine while supplying gaseous fuel to the air intake at the upstream side of the pressurizing device through the first fluid conduit, wherein the engine start indicating device is further structured to close the valve to cease gaseous fuel supply from the second fluid conduit in response to the engine transitioning from the starting operating condition to a running operating condition where the engine is entirely supplied with gaseous fuel from the first fluid conduit.

20. The apparatus of claim 19, wherein the engine start indicating device comprises a starting solenoid wired in parallel with the electronic control input, such that when the starter solenoid is powered the valve is open.

21. The apparatus of claim 19, wherein the engine start indicating device comprises a controller having an electronic output wired to the electronic control input, the controller structured to:

determine whether the engine is in the starting operating condition; and provide the electronic signal on the electronic output in response to determining the engine is in the starting operating condition.

22. The apparatus of claim 21, wherein the controller is further structured to interpret a power transfer operating condition and to provide the electronic signal on the electronic output in response to determining the power transfer operating condition is a backup power condition.

23. The apparatus of claim 22, wherein the power transfer operating condition comprises a state of one of a power transfer switch and a power transfer signal, the apparatus further comprising a load selectively powered by a primary power source and a backup power source, wherein the backup power source comprises a generator driven by the engine, and wherein the power transfer operating condition in the backup power condition indicates a power source of the load is switching from the primary power source to the backup power source.

24. The apparatus of claim 19, further comprising an air intake bypass structured to bypass at least one restrictive component disposed in the air intake, and an air switching valve responsive to an electronic air control input, wherein the engine start indicating device is further structured to provide an air bypass electronic signal in response to the internal combustion engine being in the starting operating condition.

25. The apparatus of claim 19, wherein the valve is a normally-closed valve positioned such that pressure in the air intake normally closes the valve.

26. A method, comprising:
fluidly coupling a gaseous fuel supply for an engine to an air intake of the engine upstream of a pressurizing device in the air intake with a first fuel conduit;
fluidly coupling an upstream side of a valve in a second fuel conduit to the gaseous fuel supply for the engine;
fluidly coupling a downstream side of the valve to the air intake of the engine at a position downstream of the pressurizing device so that the second fuel conduit bypasses the pressurizing device;
in response to starting the engine, opening the valve to route gaseous fuel from the gaseous fuel supply through the second conduit to the air intake at the position downstream of the pressurizing device for a period of time and supplying gaseous fuel to the air intake through the first fluid conduit upstream of the pressurizing device while the engine is in a starting condition; and
in response the engine transitioning from the starting condition to a running operating condition over the period of time, closing the valve at the end of the period of time to cease gaseous fuel supply from the second fluid conduit so the engine in the running operating condition is entirely supplied with gaseous fuel from the first fluid conduit upstream of the pressurizing device.

27. The method of claim 26, wherein the period of time corresponds to the engine obtaining a minimum speed that is below an idle speed.

28. The method of claim 26, wherein the period of time at which the valve is opened begins before starting of the engine when a transfer switch coupled to an electrical load indicates power for the electrical load is to be supplied by a generator coupled to the engine.

29. The method of claim 26, wherein the pressurizing device includes a compressor or a turbocharger.

30. The method of claim 26, wherein the valve is responsive to one or more control signals from a controller generated in response to the starting of the engine.

* * * * *